(12) United States Patent
Savage (10) Patent No.: US 9,229,131 B2
(45) Date of Patent: Jan. 5, 2016

(54) METHOD AND SYSTEM FOR ESTIMATING EVAPORATION REPRESENTATIVE OF AN AREA

(75) Inventor: Michael John Savage, Bellevue (ZA)

(73) Assignee: UNIVERSITY OF KWAZULU-NATAL, Chilton Hills (ZA)

( * ) Notice: Subject to any disclaimer, the term of this patent is extended or adjusted under 35 U.S.C. 154(b) by 869 days.

(21) Appl. No.: 13/394,132

(22) PCT Filed: Sep. 2, 2010

(86) PCT No.: PCT/IB2010/053946
§ 371 (c)(1), (2), (4) Date: May 15, 2012

(87) PCT Pub. No.: WO2011/027313
PCT Pub. Date: Mar. 10, 2011

(65) Prior Publication Data
US 2012/0232798 A1    Sep. 13, 2012

(30) Foreign Application Priority Data

Sep. 2, 2009    (ZA) .................................. 2009/06090

(51) Int. Cl.
*G01W 1/00*    (2006.01)
*A01G 25/16*    (2006.01)

(52) U.S. Cl.
CPC ............... *G01W 1/00* (2013.01); *A01G 25/167* (2013.01)

(58) Field of Classification Search
None
See application file for complete search history.

(56) References Cited

U.S. PATENT DOCUMENTS

| 5,150,171 | A  | * | 9/1992  | Hill et al. .................. 356/128 |
| 5,539,637 | A  | * | 7/1996  | Upchurch et al. ............ 700/284 |
| 5,696,671 | A  |   | 12/1997 | Oliver |
| 7,337,042 | B2 | * | 2/2008  | Marian ..................... 700/284 |
| 7,634,393 | B1 |   | 12/2009 | Tunick et al. |
| 2003/0126155 | A1 |   | 7/2003  | Parker et al. |
| 2004/0225412 | A1 |   | 11/2004 | Alexanian |
| 2005/0011797 | A1 |   | 1/2005  | Chen et al. |
| 2006/0262311 | A1 | * | 11/2006 | Muta et al. .................. 356/437 |
| 2008/0091307 | A1 | * | 4/2008  | Dansereau et al. .......... 700/284 |

OTHER PUBLICATIONS

International Search Report for corresponding PCT Application No. PCT/IB2010/53946; 1pg.

* cited by examiner

*Primary Examiner* — Aditya Bhat
(74) *Attorney, Agent, or Firm* — Christie, Parker & Hale, LLP (57) ABSTRACT

This invention related to a method of and a system for estimating evaporation representing an area at a particular location The method comprises receiving air temperature information, using the received air temperature information to determine at least average air temperature, standard deviation of the air temperature, and skewness of the air temperature at the particular location, receiving soil heat flux information and net irradiance information indicative of soil heat flux and net irradiance at the particular location respectively, determining, sensible heat flux at the particular location by using at least the determined average air temperature, standard deviation of the air temperature, and skewness of the air temperature associated with the particular location, and determining an estimate of the evaporation at the particular location by using the determined sensible heat flux, received soil heat flux and net irradiance information.

31 Claims, 6 Drawing Sheets

METHOD AND SYSTEM FOR ESTIMATING EVAPORATION REPRESENTATIVE OF AN AREA

CROSS-REFERENCE TO RELATED APPLICATION

This application is a National Phase Patent Application and claims the priority of International Application Number PCT/IB2010/053946 filed on Sep. 2, 2010, which claims priority of South Africa patent Application No. 2009/06090, filed on Sep. 2, 2009.

BACKGROUND OF THE INVENTION

THIS invention relates to a method of and a system for estimating sensible heat flux and hence evaporation representative of an area substantially in real-time for example sub-hourly. The invention also relates to a datalogger device and a data-logging kit for estimating evaporation.

Evaporation is a key component of the water balance at the Earth's surface. While its determination is important for water resource management, evaporation is seldom measured directly and usually inferred from other measurements. For example, data from an automatic weather station allow grass reference evaporation and tall-crop reference evaporation to be estimated in near real-time. The disadvantage of this method is that a crop factor (K) is required to calculate offline the actual evaporation: actual evaporation=K×grass reference evaporation. The crop factor varies with crop type, stage of crop growth and management practice(s).

Other methods and/or systems to determine evaporation are computationally intensive and do not allow or provide for near real-time estimation of evaporation. Also, other methods and/or systems to determine evaporation are prohibitively expensive, are high maintenance, or require specialised skills to operate.

A need exists for an inexpensive, low-power and reasonably accurate system that allows sub-hourly estimates of evaporation and does not require calibration.

It is an object of the present invention at least to address the abovementioned problems and need.

SUMMARY OF THE INVENTION

According to a first aspect of the invention there is provided a method of estimating sensible heat flux representing an area at a particular location substantially sub-hourly, the method comprising:
  receiving air temperature information from temperature sensors at the particular location;
  using the received air temperature information to determine average air temperature, standard deviation of the air temperature, and skewness of the air temperature associated with the particular location substantially sub-hourly; and
  determining, substantially sub-hourly, sensible heat flux associated with the particular location by using at least the determined average air temperature, standard deviation of the air temperature, and skewness of the air temperature associated with the particular location.

The method may include determining an atmospheric stability condition from an air temperature difference between two levels above a canopy surface. Instead, or in addition, the method may include determining said atmospheric stability condition from a third-order air temperature structure function for a defined time lag.

The method may preferably comprise estimating sensible heat flux substantially in real-time.

According to a second aspect of the invention there is provided a method of estimating evaporation representing an area at a particular location, the method comprising:
  receiving air temperature information from temperature sensors at the particular location;
  using the received air temperature information to determine at least average air temperature, standard deviation of the air temperature, and skewness of the air temperature at the particular location substantially sub-hourly;
  receiving soil heat flux information, the soil heat flux information being indicative of soil heat flux at the particular location;
  receiving net irradiance information, the net irradiance information being indicative of net irradiance at the particular location;
  determining, substantially sub-hourly, sensible heat flux at the particular location by using at least the determined average air temperature, standard deviation of the air temperature, and skewness of the air temperature associated with the particular location, and
  determining, substantially sub-hourly, an estimate of the evaporation at the particular location by using the determined sensible heat flux, received soil heat flux information, and received net irradiance information.

The method may comprise estimating evaporation substantially in real-time, near real-time, or sub-hourly.

The method may comprise receiving the air temperature information indicative of the skewness of air temperature from a mobile or portable datalogger device, the datalogger device comprising a statistical moment function to determine the skewness of the air temperature substantially in real-time. Instead, or in addition, the method may comprise determining the skewness of the air temperature substantially in real-time from statistical moment information associated with the air temperature data received from the datalogger.

The method may comprise:
  determining a structure function of air temperature, $C_T^2$ substantially in real-time and
  using the determined structure function of air temperature $C_T^2$ to determine a structure parameter of refractive index, $C_n^2$, substantially in real-time.

In particular, the method may comprise:
  receiving air temperature difference information between air temperatures measured by first and second air temperature sensors respectively; and
  using the received air temperature difference information and a sensor distance between the first and second temperature sensors to determine the structure function of air temperature $C_T^2$.

The method may comprise receiving the sensor distance from a user. Instead, or in addition, the sensor distance is a pre-specified distance.

The method may comprise receiving the air temperature difference information from an air temperature difference sensor. The temperature difference sensor may comprise the first and second temperature sensors spaced at a known sensor distance. The sensor distance may be a specified or user-defined sensor distance.

The method may comprise determining the sensible heat flux by a temperature-variance method, including adjustment for air temperature skewness, in the inertial sub-layer. The temperature variance method may rely on Monin-Obukhov Similarity Theory (MOST).

The method may comprise using the determined structure parameter of refractive index $C_n^2$ to determine the sensible heat flux offline by way of an iterative procedure using MOST.

The method may comprise determining the sensible heat flux, for the roughness sub-layer, by way of an air temperature structure function for a user-specified time lag. In particular, the method may comprise determining sensible heat flux from an air temperature structure function of order three.

Determining the estimate of evaporation may comprise subtracting the determined sensible heat flux and received soil heat flux from the net irradiance.

The method may comprise determining air temperature structure functions of order two, three and five respectively from which the method may comprise using the determined air temperature structure functions to determine sensible heat flux offline by way of a surface renewal method typically by using the determined air temperature structure functions of order two, three and five.

The method may further comprise:
receiving relative humidity information associated with the particular location;
receiving wind speed information associated with the particular location;
determining grass reference evaporation; and
determining tall-crop reference evaporation.

According to a third aspect of the present invention, there is provided a system for estimating evaporation representative of an area at a particular location, the system comprising:
an air temperature receiver module arranged to receive air temperature information from temperature sensors at the particular location;
a processor operable to use the received air temperature information to determine at least average air temperature, standard deviation of the air temperature, and skewness of the air temperature at the particular location substantially sub-hourly;
a soil heat flux receiver module arranged to receive soil heat flux information, the soil heat flux information being indicative of soil heat flux of the particular location;
a net irradiance receiver module arranged to receive net irradiance information, the net irradiance information being indicative of net irradiance associated with the particular location;
a sensible heat flux determining module arranged to determine, substantially in real-time, sensible heat flux associated with the particular location by using at least the determined at least average air temperature, standard deviation of the air temperature, and skewness of the air temperature at the particular location substantially sub-hourly, and
an evaporation determining module arranged to determine, substantially in real-time, an estimate of the evaporation level of the particular location by using at least the determined sensible heat flux, received soil heat flux information, and received net irradiance information.

At least the air temperature receiver module may be communicatively coupled with a mobile or portable datalogger device, the datalogger device comprising a statistical moment function to determine the skewness of the air temperature substantially in real-time.

The sensible heat flux determining module may be arranged to determine the sensible heat flux by a temperature variance method, including adjustment for air temperature skewness, in the inertial sub-layer. The temperature variance method may rely on Monin-Obukhov Similarity Theory (MOST).

The evaporation determining module may be arranged to determine the estimate of evaporation by subtracting the determined sensible heat flux and received soil heat flux from the net irradiance.

The system may be arranged to:
determine a structure function of air temperature, $C_T^2$ substantially in real-time and
use the determined structure function of air temperature $C_T^2$ to determine a structure parameter of refractive index, $C_n^2$, substantially in real-time.

The system may further be arranged to:
receive air temperature difference information between air temperatures measured by first and second air temperature sensors respectively;
determine or receiving a sensor distance between the first and second temperature sensors; and
use the received air temperature difference information and the determined or received sensor distance to determine the structure function of air temperature $C_T^2$.

According to a fourth aspect of the invention there is provided a machine-readable medium embodying instructions which, when executed by a machine, cause the machine to:
receive air temperature information from temperature sensors at a particular location;
use the received air temperature information to determine average air temperature, standard deviation of the air temperature, and skewness of the air temperature associated with the particular location substantially sub-hourly;
receive soil heat flux information, the soil heat flux information being indicative of soil heat flux associated with the particular location;
receive net irradiance information, the net irradiance information being indicative of net irradiance associated with the particular location;
determine, substantially sub-hourly, sensible heat flux associated with the particular location by using at least the determined average air temperature, standard deviation of the air temperature, and skewness of the air temperature associated with the particular location substantially sub-hourly, and
determine, substantially sub-hourly, an estimate of the evaporation level of the particular location by using at least the determined sensible heat flux, received soil heat flux information, and received net irradiance information.

The machine-readable medium may cause the machine to:
determine a structure function of air temperature, $C_T^2$ substantially in real-time; and
use the determined structure function of air temperature $C_T^2$ to determine a structure parameter of refractive index, $C_n^2$, substantially in real-time.

The machine-readable medium may further cause the machine to:
receive air temperature difference information between air temperatures measured by first and second air temperature sensors respectively;
determine or receive a sensor distance between the first and second temperature sensors; and
use the received air temperature difference information and the determined or received sensor distance to determine the structure function of air temperature $C_T^2$.

In an example embodiment, the machine may be a datalogger device. The machine-readable medium may therefore comprise embedded code executable by the datalogger device.

According to a fifth aspect of the invention there is provided a datalogger device, the datalogger device comprising:
means for receiving air temperature information from temperature sensors at a particular location;
means for using the received air temperature information to determine average air temperature, standard deviation of the air temperature, and skewness of the air temperature associated with the particular location substantially sub-hourly;
means for receiving soil heat flux information, the soil heat flux information being indicative of soil heat flux associated with the particular location;
means for receiving net irradiance information, the net irradiance information being indicative of net irradiance associated with the particular location;
means for determining, substantially sub-hourly, sensible heat flux associated with the particular location by using at least the determined average air temperature, standard deviation of the air temperature, and skewness of the air temperature associated with the particular location, and
means for determining, substantially sub-hourly, an estimate of the evaporation level of the particular location by using at least the determined sensible heat flux, received soil heat flux information, and received net irradiance information.

The device may comprise:
means for determining a structure function of air temperature, $C_T^2$ substantially in real-time and means for using the determined structure function of air temperature $C_T^2$ to determine a structure parameter of refractive index, $C_n^2$, substantially in real-time.

The device may further comprise:
means for receiving air temperature difference information between air temperatures measured by first and second air temperature sensors respectively;
means for determining or receiving a sensor distance between the first and second temperature sensors; and
means for using the received air temperature difference information and the determined or received sensor distance to determine the structure function of air temperature $C_T^2$.

The datalogger device may preferably be a datalogger with a statistical moment instruction so as at least to determine the skewness of the air temperature. The datalogger device may be arranged to determine skewness from the moment of order three, average air temperature and the standard deviation of air temperature.

According to a sixth aspect of the invention there is provided a data-logging kit, comprising:
a datalogger device as hereinbefore described; and
an air temperature difference sensor comprising:
  a first air temperature sensor; and
  a second air temperature sensor spaced at a predetermined horizontal sensor distance from the first air temperature sensor.

DESCRIPTION OF PREFERRED EMBODIMENTS

In the following description, for purposes of explanation, numerous specific details are set forth in order to provide a thorough understanding of an embodiment of the present disclosure. It will be evident, however, to one skilled in the art that the present disclosure may be practiced without these specific details.

Figure 1:
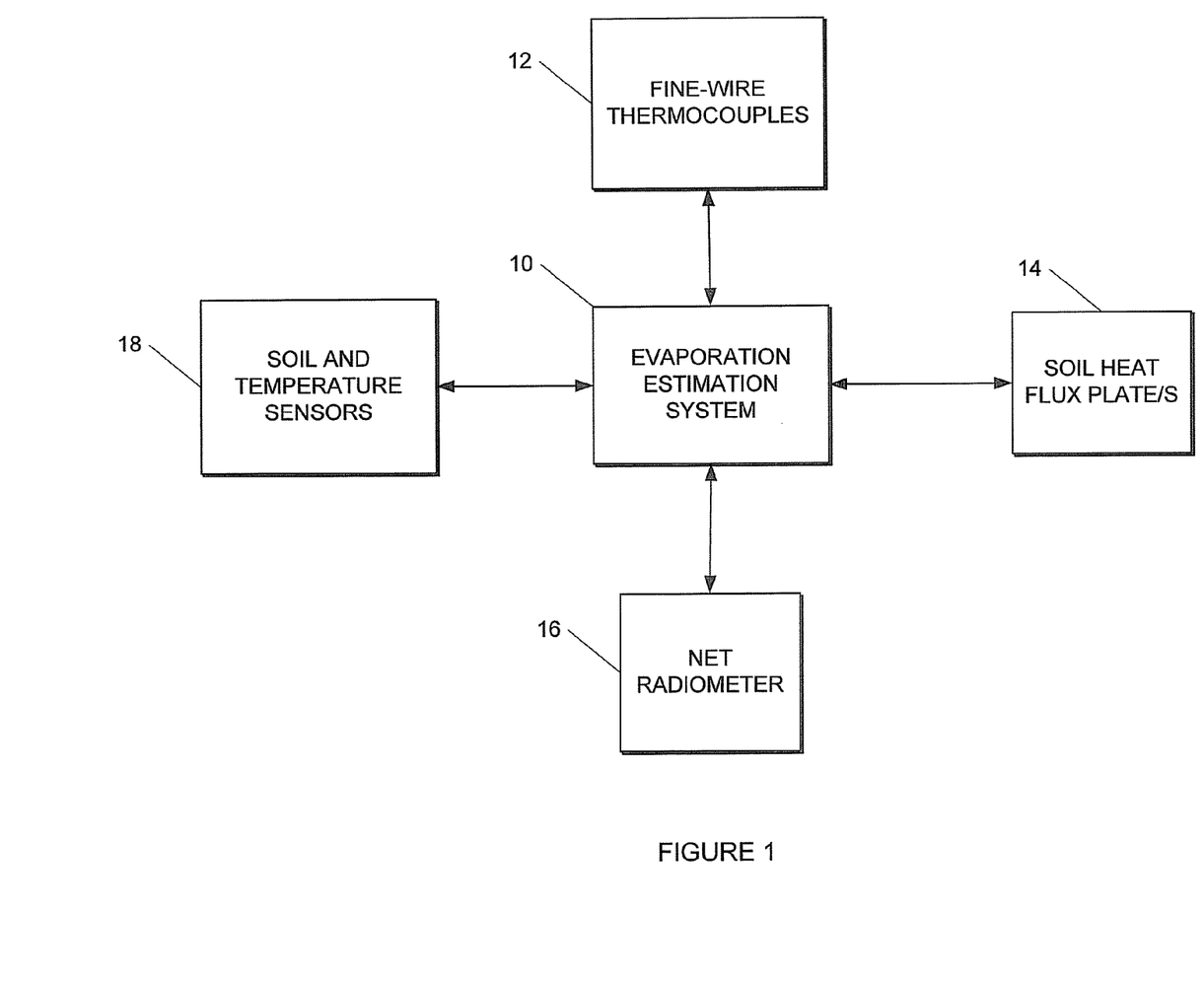
FIG. 1 shows a schematic drawing of a system in accordance with an example embodiment illustrating at least an evaporation system as herein described.
Figure 2:
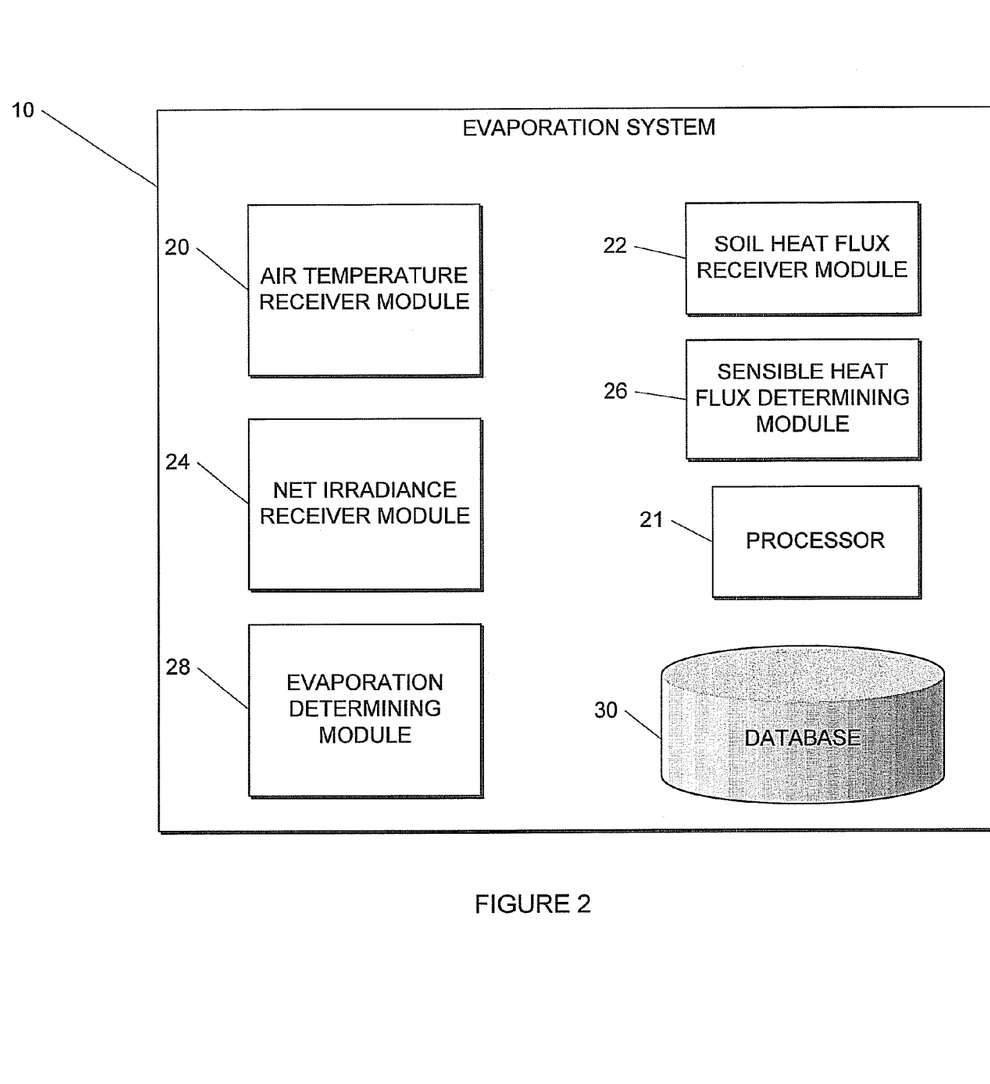
FIG. 2 shows a schematic drawing of the evaporation system of FIG. 1 in greater detail.
Figure 5:
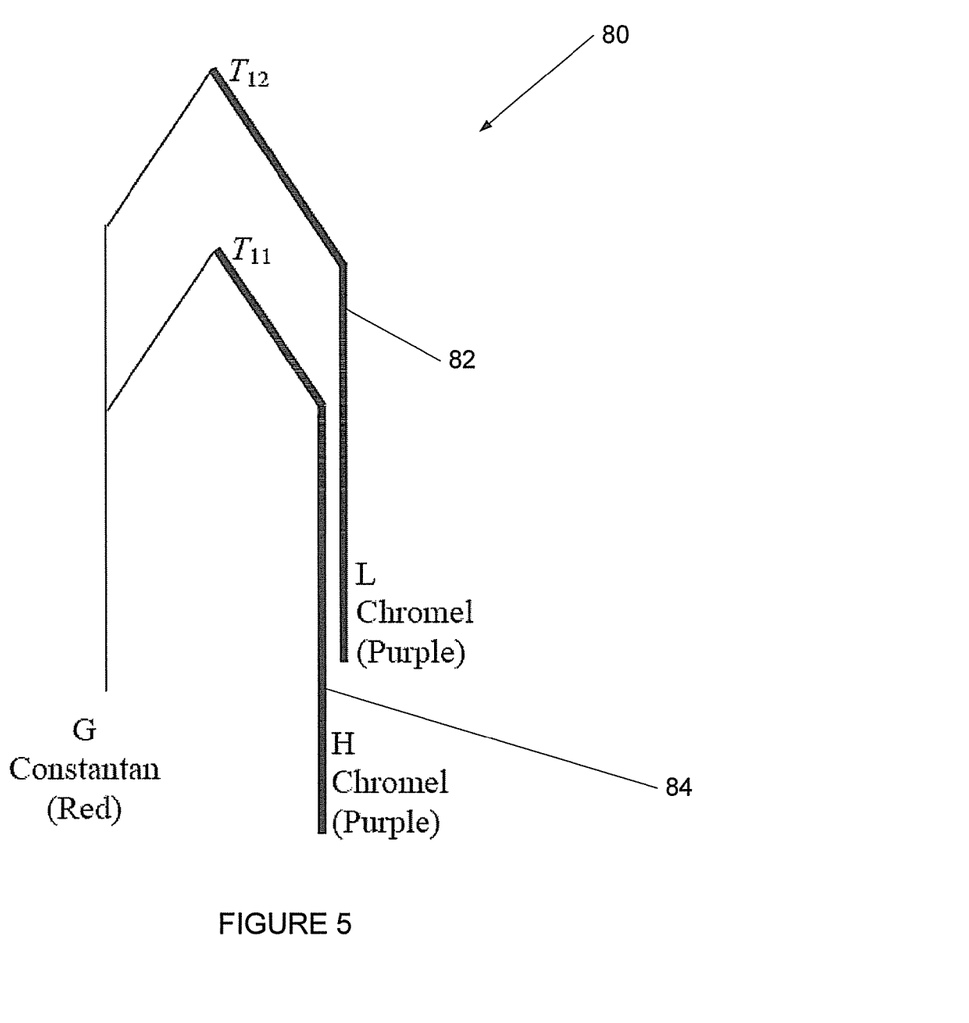
FIG. 5 shows a schematic drawing of an air temperature difference sensor in accordance with an example embodiment.

Referring to FIGS. 1, 2, and 5 of the drawings, a system for determining an estimate of evaporation at a particular location or canopy area is generally indicated by reference numeral 10. The system 10 may conveniently comprise a near real-time evaporation estimation station for the inertial layer for which Monin-Obukhov Similarity Theory (MOST) applies.

The system 10 is communicatively coupled to a fine-wire thermocouple/s 12 (in parallel or in triplets), for example unshielded and naturally-ventilated fine-wire (75 μm) thermocouples for high frequency air temperature measurements, a soil heat flux plate/s 14, a net radiometer 16, and soil and temperature sensors 18 to receive soil heat flux information respectively therefrom. In other example embodiments (not shown), the fine-wire thermocouple/s 12, the soil heat flux plate/s 14, the net radiometer 16, and soil and temperature sensors 18 may form part of the system 10.

The system 10 may comprise a plurality of components or modules which correspond to the functional tasks to be performed by the system 10. In this regard, "module" in the context of the specification will be understood to include an identifiable portion of code, computational or executable instructions, data, or computational object to achieve a particular function, operation, processing, or procedure. It follows that a module need not be implemented in software; a module may be implemented in software, hardware, or a combination of software and hardware. Further, the modules need not necessarily be consolidated into one device but may be spread across a plurality of devices.

In particular, the system 10 comprises an air temperature receiver module 20 arranged to receive air temperature information associated with the particular area or location. The system 10 may comprise a processor 21 arranged to use the received air temperature information to determine the average air temperature, $\overline{T}$, standard deviation of the air temperature, $\sigma_T$, and/or skewness of the air temperature or air temperature skewness, $S_T$, associated with the area. In other example embodiments, the air temperature receiver module 20 is arranged to receive the average air temperature, $\overline{T}$, standard deviation of the air temperature, $\sigma_T$, and/or skewness of the air temperature or air temperature skewness, $S_T$.

The processor 21 may advantageously be arranged to control the operation of the system 10. It is to be understood that the processor 21 may be one or more microprocessors, controllers, or any other suitable computing device, resource, hardware, software, or embedded logic.

The system 10, particularly the module 20, may be communicatively coupled to a datalogger or datalogger device (not shown) to receive the air temperature information therefrom. The datalogger device may be coupled to, or may optionally comprise, the thermocouples 12 to obtain air temperature information therefrom. Similarly, the datalogger device may also be coupled to, or comprise, the soil heat flux plates 14, the net radiometer 16, the sensors 18, and/or any other sensor/s (not illustrated) used by the system 10 to receive data therefrom respectively for use by the system 10 as will be described below.

The datalogger device advantageously comprises a statistical moment instruction to facilitate the system 10, or the datalogger device, to determine the skewness of the air temperature substantially in real-time.

The statistical moment instruction has already been installed by Campbell Scientific, Inc. into many of their commercially available dataloggers, e.g. those marketed with the model designations CR1000, CR3000 and CR5000. However, dataloggers near the lower end of the range (e.g. the model designation CR1000) may be too slow efficiently to run the code which is necessary to implement the method and system as herein described.

The skewness of air temperature may be determined sub-hourly. Determined online, air temperature skewness involves the sum over a time interval of the cube of the air temperature deviation from the mean. In particular, the skewness of air temperature $S_T$ may be determined by way of the following equation:

$$S_T = \frac{1}{\sigma_T^3} \Sigma (T_i - \overline{T})^3 / n$$

where $\sigma_T$ is the standard deviation in air temperature over an averaging period, $T_i$ is the i th air temperature sample within the averaging period, $\overline{T}$ is the average air temperature and n is the number of air temperature measurements during the averaging period- n would be equal to 18000 for 10-Hz air temperature measurements and an averaging period of 30 min.

The term:

$$\frac{\sum_{i=1}^{n}(T_i - \overline{T})^3}{n}$$

corresponds to the moment value provided by the datalogger for each averaging period. The averaging period is typically sub-hourly (30 minutes).

In an example embodiment, the system 10, or parts thereof, may advantageously be provided in the datalogger device such that the datalogger device is arranged to provide the functionality of the system 10 as herein described. Instead, or in addition, the system 10, or parts thereof, may be provided in or on a computing device such as a remotely located computer, or the like. In the latter example embodiment, the datalogger device may advantageously comprise a suitable modem, for example a wireless modem, to allow the datalogger device to communicate information remotely to the system 10.

The system 10 further comprises a soil heat flux receiver module 22 arranged to receive soil heat flux information S, from the soil heat flux plates 14 or the datalogger device. The soil heat flux information is indicative of soil heat flux, S, associated with the location particularly the soil temperature, soil water content and soil heat flux at a predetermined depth. In this regard, where applicable within the specification, "information" is meant to indicate the quantity or value measured by the respective sensors.

The system 10 also comprises a net irradiance receiver module 24 arranged to receive net irradiance information from the net radiometer 16 or datalogger device, the net irradiance information being indicative of net irradiance, $R_{net}$, associated with the area.

The system 10 comprises a sensible heat flux determining module 26. The module 26 is conveniently arranged to determine, online or substantially in near real-time, sensible heat flux, H, associated with the area by using at least the received air temperature information. The module 26 may be arranged to determine sensible heat flux H by way of various methods to be discussed below.

In particular, the sensible heat flux determining module 26 is preferably arranged to determine the sensible heat flux, H, by a temperature variance or flux variance method in the inertial sub-layer i.e. $H_{TV}$ which is corrected for skewness using the received or determined skewness of air. The temperature variance method typically relies on Monin-Obukhov Similarity Theory (MOST).

In particular, the module 26 determines the sensible heat flux $H_{TV}$ online according to the following equation:

$$H = -0.993 \; \rho c_p (\sigma_T^3 kgz/\overline{T})^{0.5} \times f(S_T) \text{ (found to be valid for the range } 0.03 << -z/L < 60)$$

where $\rho$ is the density of air (kg m$^{-3}$), $c_p$ the specific heat capacity of air at constant pressure (J kg$^{-1}$ K$^{-1}$), g is the acceleration of gravity (m s$^{-2}$) and z is the measurement height (m) with k=0.41, where $\sigma_T$ (° C.) is the standard deviation of air temperature determined online within a given time period, and $\overline{T}$ is the average air temperature (° C.).

It will be noted that:

$$f(S_T) = \left( \frac{0.0549 + 0.0137 \exp(4.39 \; S_T)}{0.0137 \exp(4.39 \; S_T)} \right)^{0.5}$$

A stability condition is determined online from the air temperature difference between two levels above the canopy surface and/or from third-order air temperature structure function $S^3(r)$ where r is the air temperature time lag.

Of note then is that the temperature variance online method with adjustment for skewness relies on the average air temperature $\overline{T}$, the standard deviation of the air temperature $\sigma_T$ and the air temperature skewness $S_T$. This triplet of air temperature information, obtained for each 2-min and 30-min period, allows $H = H_{TV}$ to be calculated with the atmospheric stability state determined from $S^3(r)$ and the state confirmed using the sign of the air temperature difference between two atmospheric levels.

The system 10 also advantageously comprises an evaporation determining module 28. The evaporation determining module 28 is configured to determine, substantially in real-time for example half-hourly, an estimate of the evaporation level of the area. LE, by using at least the determined sensible heat flux H, received soil heat flux information S. and received net irradiance information $R_{net}$. It will be appreciated that the module 28 may be arranged to determine the estimate of evaporation LE by subtracting the determined sensible heat flux, for example $H_{TV}$ (corrected for air temperature skewness) and the received soil heat flux information S from the received net irradiance information $R_{net}$ according to the equation below:

$$LE = LE_{TV} = R_{net} - S - H_{TV}$$

The system 10 also comprises a database or memory means 30 operable to store information received by the system 10 as well as information determined or calculated by the system 10. Information stored in the database 30 may be advantageously accessible by a user.

The database or memory means 30 may include a machine-readable medium, e.g. memory, main memory, and/or hard disk drive, which carries a set of instructions to direct the operation of the system 10 in accordance with an example embodiment.

The sensible heat flux determining module 26 may also be arranged to determine sensible heat flux by way of structure functions such that $H=H_{SF}$. In this regard, for the roughness sub-layer, the module 26 is arranged to determine sensible heat flux from structure functions $[S^3(r)/r]_{max}$ where $$S^3(r) = \frac{1}{m-j} \sum_{i=j+1}^{m} (T_i - T_{i-j})^3$$

where m is the number of data points in a sub-hourly interval measured at frequency f, j is a sample lag between data points corresponding to a time lag (r=j/f), $T_j$ is the air temperature at time i and $T_{i-j}$ that at an earlier time i-j. While the temperatures and $S^3(r)/r$ values are available to the system 10 in near real-time, the maximum value of $S^3(r)/r$ is determined by the module 26 offline unless it is known a priori. In any event, the sensible heat flux determining module 26 is arranged to determine $H_{SF}$ for the inertial sub-layer from the following equations:

$$H = H_{SF} = \frac{k^{5/6} g^{1/3}}{\pi^{0.5}} \rho c_p (z-d)^{2/3} (\sigma_T/\overline{T})^{1/3} (S^3(r)/r)^{1/3}$$

or $$H = H_{SF} = 0.575 \rho c_p (z-d)^{2/3} \left(\sigma_T/\overrightarrow{T}\right)^{1/3} (S^3(r)/r)^{1/3}$$

where ρ is the density of air, $c_p$ the specific heat capacity of air, z the measurement height and d approximately ⅔ of the vegetation canopy height. For the roughness sub-layer, z is replaced by z-d.

As alluded to above, if the maximum of $S^3(r)/r$ and time delay are known a priori, the module 26 may be arranged to determine $H_{SF}$ substantially in real-time.

It follows that the evaporation determining module 28 is accordingly arranged to determine the evaporation estimate $LE_{SF}$, in near real-time if the maximum of $S^3(r)/r$ is known, using the determined sensible heat flux $H_{SF}$ as described above.

The sensible heat flux determining module 26 is also arranged to determine sensible heat flux by way of a surface renewal method. In this regard, it will be noted that the temperature variance measurement protocol may be extended to include the storage of the second-, third- and fifth-order air temperature structure functions ($S^2(r)$, $S^3(r)$ and $S^5(r)$ respectively).

In particular, the three functions $S^2(r)$, $S^3(r)$ and $S^5(r)$ are obtained online for each averaging period for two values of r—usually for r=0.4 s and r=0.8 s unless the user specifies otherwise. The module 26 then uses these data to determine sensible heat flux $H_{SR}$ offline using the surface renewal method according to the following equation:

$$H = \alpha z \rho c_p \frac{\partial T}{\partial t},$$

where α is a correction factor (regression coefficient fit to the above equation when H is measured independently using other methods such as eddy covariance) and $$\frac{\partial T}{\partial t} = \frac{a}{\tau}$$

where a is the amplitude of the air temperature ramps (° C) and τ the ramping period (s). An estimate of the mean value for amplitude a during an averaging time interval is determined by solving the following equation for real roots:

$$a^3 + pa + q = 0$$

where $$p = 10S^2(r) - \frac{S^5(r)}{S^3(r)}$$

and $q = 10 S^3(r)$.

The ramping period τ is calculated using $$\tau = -\frac{a^3 r}{S^3(r)}.$$

It will be appreciated that the time lag r must be much less than τ, typically τ>5r , or otherwise the structure function theory is invalid. The roots of $a^3+pa+q=0$ are obtained offline by iteration in a spreadsheet from which τ is calculated using the equation $$\tau = -\frac{a^3 r}{S^3(r)}$$

above, and ∂T/∂t is calculated using $$\frac{\partial T}{\partial t} = \frac{a}{\tau}$$

and hence $H_{SR}$ calculated using $$H = \alpha z \rho c_p \frac{\partial T}{\partial t}$$

as hereinbefore described from knowledge of the measurement height z and prior knowledge of α. Of particular note is that the surface renewal method does not depend on MOST and may therefore be applied in the roughness and inertial sub-layers.

In one example embodiment, the third-order structure function may be used for determining whether atmospheric conditions are stable or unstable.

It follows that the module 28 is also arranged to determine $LE_{SR}$ using the determined $H_{SR}$ which advantageously does not require MOST.

The module 26 is further arranged to determine the sensible heat flux by way of an air temperature structure function, $C_T^2$. In a preferred example embodiment, the system 10, and module 26 in particular, is advantageously arranged to determine the structure function of air temperature, $C_T^2$; and to use the determined structure function of air temperature $C_T^2$ to determine a structure parameter of refractive index, $C_n^2$, substantially in real-time.

The module 26 is arranged to determine $C_T^2$ by way of the following equation:

$$C_T^2 = \overline{(T_{11}-T_{12})^2}/x^{2/3}$$

where the overbar indicates a time average (typically sub-hourly), $T_{11}$ and $T_{12}$ are 10-Hz air temperatures measured a horizontal distance x apart at height $z_1$.

In a preferred example embodiment, the system 10 is in communication with an air temperature difference sensor 80 (FIG. 5). The sensor 80 comprises a first temperature sensor 82 operable to measure the first temperature $T_1$ and a second temperature sensor 84 operable to measure a second temperature $T_2$, the first and second temperature sensors 82 and 84 are spaced from each other at the predetermined sensor horizontal distance x. It will be noted that:

G—refers to the datalogger ground;
H—refers to the datalogger high analogue channel; and
L—refers to the datalogger low analogue channel.

$T_{11}$ therefore corresponds to the voltage between L and G; $T_{12}$ that between H and G, and $T_{11}-T_{12}$ that between H and L.

The sensor 80 may be similar to the thermocouple 12 and allows air temperature differences $T_{11}-T_{12}$ to be measured as well (H and L) as the individual air temperatures. The air temperature difference $T_{11}-T_{12}$ and the air temperature $T_{11}$ may be measured at high frequencies (10 Hz), and sub-hourly averages obtained. It will be understood the sensors 82 and 84 are aligned in the horizontal plane.

It follows that the module 26 is conveniently arranged to receive the first air temperature $T_{11}$ from the first air temperature sensor 82; and to receive the second air temperature $T_{12}$ from the second air temperature sensor 84. The module 26 may be arranged to determine the sensor distance x and the air temperature difference $T_{11}-T_{12}$ between the sensors 82 and 84. Instead, or in addition, the system 10 may be arranged to receive the sensor distance x depending on the sensor 80. The sensor distance x may optionally be made known a priori to the system 10. The module 26 is arranged to use the first and second air temperatures $T_{11}$ and $T_{12}$ (particularly the temperature difference $T_{11}-T_{12}$) and the sensor distance x to determine the structure function of air temperature. $C_T^2$ using the equation as previously presented. The optimum distance x may preferably be less than 0.5 m. Since the air temperature may vary in the vertical due to the temperature difference between the canopy surface and the overlying air, measurements of $T_{11}$ and $T_{12}$ should be in the horizontal plane separated by a known distance.

In an example embodiment, the module 26 is preferably arranged to receive the temperature difference $T_{11}-T_{12}$ between the first and second temperature sensors 82 and 84 respectively from the sensor 80.

In this embodiment, high frequency measurements allow the air temperature structure parameter $C_T^2$ to be calculated if a pair of thermocouples are used at a single measurement height and configured to measure the air temperature difference between two fine-wire thermocouples a known distance apart. Using $C_T^2$, the structure parameter for refractive index $C_n^2$ may be determined. Together with wind speed measurements, the application of MOST and an iterative procedure applied offline, sensible heat flux $H=H_{MOST}$ may be calculated. This then allows another estimate of evaporation. The method forms the basis for scintillometry except that in scintillometry $C_n^2$ is obtained through the scattering of a horizontal laser or near-infrared beam above canopies. The inventor believes that inexpensive measurements of $C_T^2$ from high frequency air temperature measurements, as provided by the embodiment under discussion, can be used to validate scintillometer measurements in situ.

Referring again to FIG. 5, the module 26 is then further arranged to determine $C_n^2$ using the following equation:

$$C_T^2 = C_n^2 \cdot \left(\frac{T^2}{aP}\right)^2 \cdot \left(1 + \frac{0.03}{\beta}\right)^{-2}$$

assuming a perfect correlation between water vapour pressure and air temperature fluctuations, where T is the air temperature (K), $a=0.789 \times 10^{-3}$ K kPa$^{-1}$, P is the atmospheric pressure (kPa) and $\beta$ the Bowen ratio.

If a wind speed sensor is provided, the friction velocity may be estimated offline using an iterative procedure. $H=H_{MOST}$ may be determined offline by module 26 using MOST.

In summary, the module 26 is arranged to determine the structure parameter of temperature $C_T^2$ (K$^2$ m$^{-2/3}$) online from the air temperature difference between a known horizontal distance as hereinbefore described.

The sensible heat flux is:

$$H = \rho c_p u_* T_* \quad (1)$$

where $\rho$ is the density of air (kg m$^{-3}$), $c_p$ the specific heat capacity of air at constant pressure (J kg$^{-1}$ K$^{-1}$), $u_*$ the friction velocity (m s$^{-1}$) and $T_*$ (K) the temperature scaling parameter. Invoking MOST, $T_*$ is given by $$T_* = C_T \cdot (z-d)^{1/3} \cdot [f(\zeta)]^{-1/2} \quad (2)$$

where z (m) is the measurement height (m), d the zero-plane displacement (m) (approximately 0.67 times the canopy height) and $$\zeta = \frac{z-d}{L}$$

the argument of the MOST semi-empirical and dimensionless function $$f(\zeta) = 4.9(1-7\zeta)^{-2/3} \quad (3)$$

where L is the Obukhov length (m) is defined by $$L = \frac{T}{kg} \frac{u_*^2}{T_*} \quad (4)$$

where k is the von Kármán constant (0.41), g the acceleration of gravity (m s$^{-2}$) and $u_*$ the friction velocity estimated from horizontal wind speed U using:

$$u_* = 0.14 \, U \quad (5)$$

It will be appreciated that it is not possible to solve the above equations (1) to (5) analytically for H. Hence the module 26 uses an offline iterative procedure. Combining equations (1) to (5) allows L and H to be estimated using equation (1) by iteratively varying L. The module 26 may be arranged to perform these calculations by way of a spreadsheet.

Since the structure parameter of refractive index $C_n^2$ ($K^2$ $m^{-2/3}$) is measured using scintillometers and possibly other measurement systems, it is calculated for possible reference purposes using:

$$C_n^2 = \frac{C_T^2 \cdot \left(1 + \frac{0.03}{\beta}\right)^2}{\left(\frac{T^2}{aP}\right)^2} \quad (1)$$

assuming a perfect correlation between air temperature and water vapour pressure fluctuations where T is the air temperature (K), $a=0.789 \times 10^{-3}$ K $kPa^{-1}$, P the atmospheric pressure (kPa) and $\beta$ the Bowen ratio calculated using:

$$\beta = \frac{H}{-R_n - S - H} \quad (2)$$

where $R_{net}$ is measured or received using a net radiometer as hereinbefore described. S is calculated or received using soil temperature as hereinbefore described, and soil heat flux and soil water content measurements and H is obtained using the temperature variance method as hereinbefore described, including the adjustment for skewness also as hereinbefore described.

It follows that the module 28 is then arranged to determine $LE_{MOST}$ using the determined $H_{MOST}$ offline.

The system 10 may further be arranged to receive relative humidity information associated with the area; and wind speed information associated with the area. In this example embodiment, the system 10 is communicatively coupled to a solarimeter, relative humidity sensor, wind speed and direction sensors, and a rain gauge (not shown). The system 10 may then be arranged to determine a grass reference; and also to determine an estimate for tall-crop reference evaporation ($ET_0$), for example by using the Penman-Monteith method. It will be noted that the system 10 may therefore be arranged to determine crop factors online using the following equation:

$$K = LE_{TV}/ET_0$$

It will be noted that the system 10 may allow a user to select the method of determining the evaporation estimate as desired. Instead, or in addition, the system 10 may be arranged to provide all determined information to the user for example via a graphical user interface (GUI), or the like.

Figure 3:
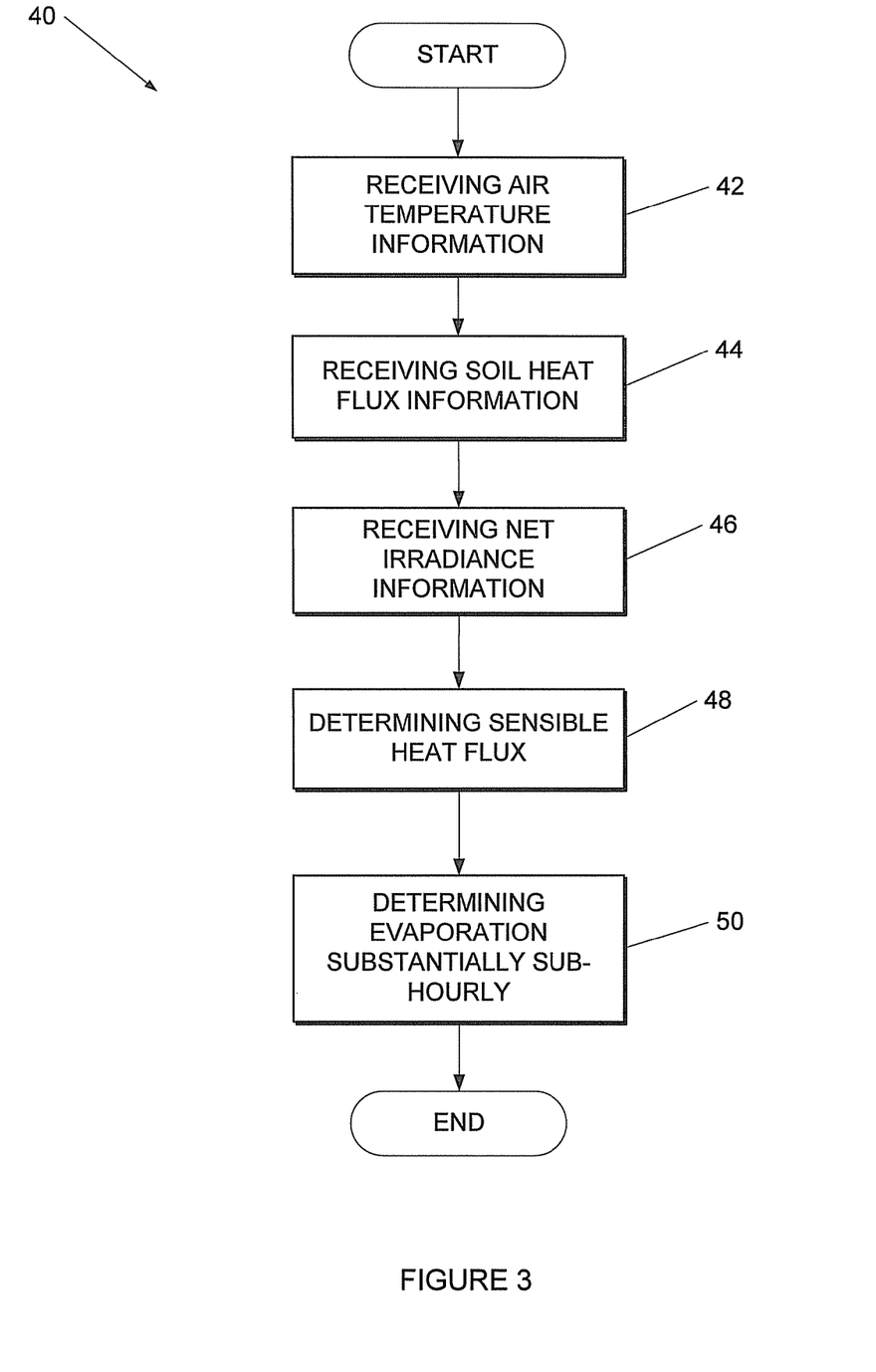
FIG. 3 shows a high level flow diagram of a method in accordance with an example embodiment.
Figure 4:
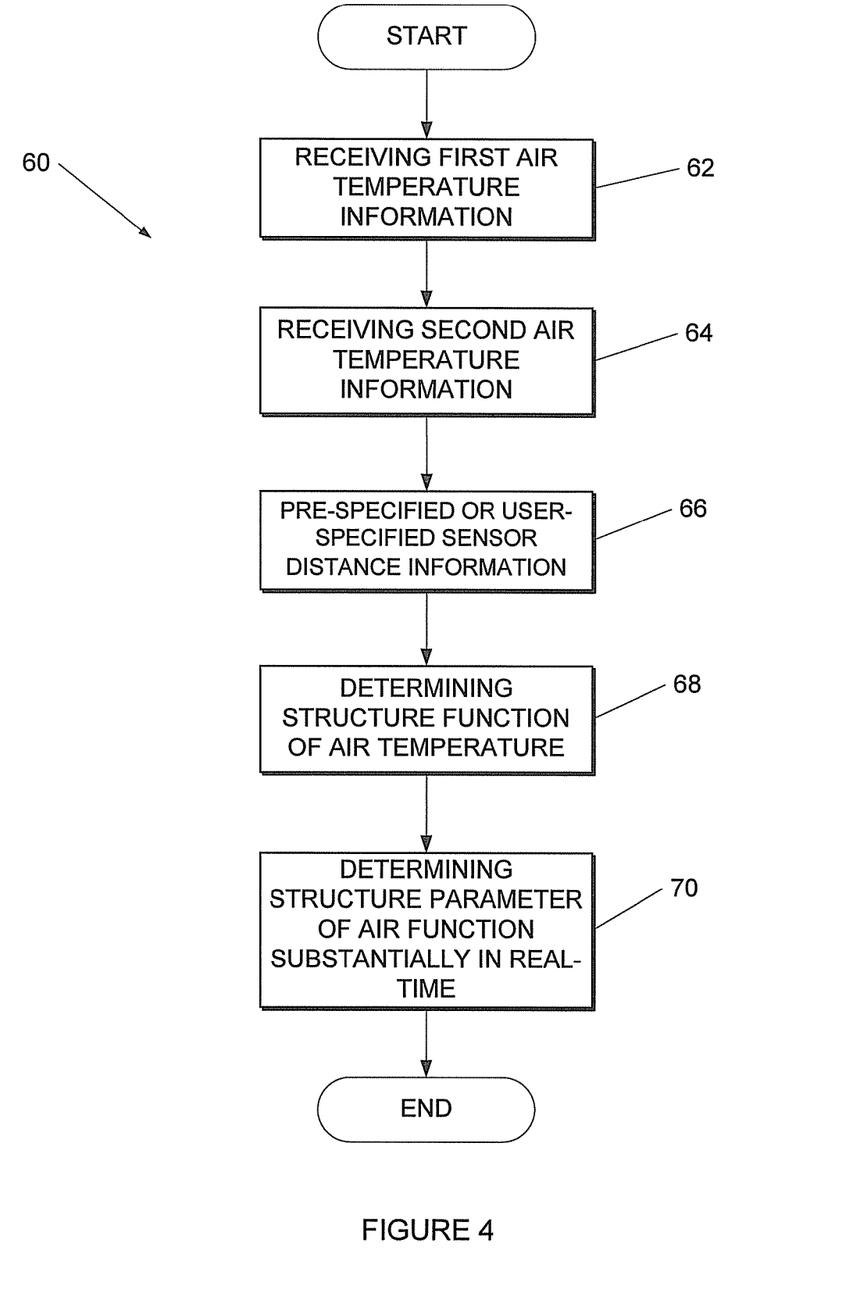
FIG. 4 shows a high level flow diagram of another method in accordance with an example embodiment.

Example embodiments will now be further described in use with reference to FIGS. 3 and 4. The example methods shown in FIGS. 3 and 4 are described with reference to FIGS. 1, 2 and 5, although it is to be appreciated that the example methods may be applicable to other systems (not illustrated) as well.

Referring now to FIG. 3, where a flow diagram of a method in accordance with an example embodiment is generally indicated by reference numeral 40.

The method 40 comprises receiving, at block 42, air temperature information associated with the area for example by way of the air temperature receiver module 20 as hereinbefore described.

The method 40 then comprises receiving, at block 44, soil heat flux information for example by way of the soil heat flux receiver module 22 as described above.

The method 40 also comprises receiving, at block 46, net irradiance information from the net irradiance receiver module 24.

The method 40 then comprises determining, at block 48, substantially sub-hourly, sensible heat flux via the sensible heat flux determining module 26 by using at least the received air temperature information as hereinbefore described. The user may be permitted to select one or more ways in which sensible heat flux is calculated. However, in a preferred example embodiment, the method comprises determining the sensible heat flux by way of the temperature variance method as hereinbefore described.

The sign of the sensible heat flux may be determined by the sign of the third-order air temperature structure function (discussed below).

The method 40 further comprises determining, at block 50, substantially in real-time, an estimate of the evaporation level LE of the area by using at least the determined sensible heat flux, received soil heat flux information, and received irradiance information for example by way of the evaporation determining module 28 also as hereinbefore described.

This determined evaporation LE may be presented to the user via a GUI, or the like together with any other information determined by the system 10. The system 10 may also be arranged to store the determined LE or other information in the database 30.

Referring now to FIG. 4 of the drawings where another method in accordance with an example embodiment is generally indicated by reference numeral 60. It will be noted that the method 60 may follow from or may optionally form part of the method 40.

In any event, the method 60 comprises receiving, at block 62, a first temperature $T_{11}$ from the first temperature sensor 82 of the sensor 80.

The method 60 further comprises receiving, at block 64, a second temperature $T_{12}$ from the second temperature sensor 84 of the sensor 80.

The method 60 may comprise determining an air temperature difference $T_{11}-T_{12}$ between the first and second temperatures $T_{11}$ and $T_{12}$. The method 60 may comprise receiving the temperature difference $T_{11}-T_{12}$ from the sensor 80.

The method 60 typically comprises determining or receiving, at block 66, the sensor distance x between the first and second temperature sensors 82 and 84. This sensor distance x may be specified by the user. In this regard the sensor distance x is typically pre-specified or user-specified data.

The method 60 then typically comprises using, at block 68, at least the received first and second temperatures, $T_{11}$ and $T_{12}$, or preferably the determined temperature difference $T_{11}-T_{12}$, and the sensor distance x to determine the structure function of air temperature, $C_T^2$ as hereinbefore described.

Typically the method 60 comprises determining air temperature structure functions of orders of two, three and five. As hereinbefore described the sign of the sensible heat flux is determined from the third-order air temperature structure function.

These determined air temperature structure functions may conveniently be used to determine sensible heat flux offline using the surface renewal method hereinbefore mentioned.

In any event, the method 60 further comprises using, at block 70, the determined structure function of air temperature $C_T^2$ to determine a structure parameter of refractive index $C_n^2$, substantially in real-time as hereinbefore described.

It will be noted that the determined structure parameter of refractive index $C_n^2$ may be used to determine $H_{MOST}$ offline using an iterative procedure as hereinbefore described.

The structure function method may be used to determine sensible heat flux sub-hourly for the roughness sub-layer.

It will be noted that if the system is arranged to receive wind speed information, the system 10 is optionally arranged to determine friction velocity u., based on MOST, involving the air temperature mean, standard deviation and skewness and semi-empirical constants, for the forced and free convection stability range.

In an example embodiment, two estimates of $H_{TV}$ (and hence $LE_{TV}$ if $R_{net}$ and S are also measured) may be obtained: $T_{21}$ and $T_{22}$ at height $z_2$ and $T_{11}$ and $T_{12}$ at height $z_1$. Two estimates of $C_T^2$ may be obtained: one using $C_{T_2}^2 = \overline{(T_{21}-T_{22})^2}/x_2^{2/3}$ for height $z_2$ and $C_{T_1}^2 = \overline{(T_{11}-T_{12})^2}/x_1^{2/3}$ for height $z_1$, for the offline calculation of $H=H_{MOST}$ using MOST using additional the measurement of wind speed measurements. Four estimates of air temperature structure function (of order two, three and five), two for each of the two heights $z_1$ and $z_2$, for four different offline calculations of sensible heat flux by surface renewal.

The methods 40 and 60 may preferably be computer implemented methods.

It will be appreciated that the methods 40 and 60 may be implemented on a suitable computing device, for example on the computer or the datalogger device by way of associated software. For example, the methods 40 and 60 (or portions thereof) may be implemented by the datalogger device by way of a set of embedded computer executable instructions arranged to instruct the datalogger device to perform at least some of the steps of the method 40 and 60. The instructions may comprise embedded code or software provided on machine readable medium/s associated with the datalogger device, for example, a memory means of the datalogger device.

EXAMPLE OF DETAILED IMPLEMENTATION

In the following, the main elements of one detailed implementation of a system according the invention are described:

1. a datalogger with a PC card storage device, cell-phone capability, enclosure, battery, and instrument mast. Typically, a CR3000 datalogger, available from Campbell Scientific Inc. (Logan, Utah, USA), is sufficient and has been used in all testing by the Inventor.
2. a datalogger program containing instructions for simple measurements and output instructions for $H_{TV}$, $H_{TV}$ corrected for skewness;
3. sensors: net radiometer, soil heat flux plate(s), soil and temperature sensors, and for the high frequency air temperature measurements, the fine-wire thermocouples (in parallel or triplets); and
4. final online calculation of LE from $R_{net}$–S–$H_{TV}$ as part of the datalogger program.

The evaporation estimation system and method herein described allow substantially real-time estimation (at roughly sub-hourly intervals) of evaporation for the inertial layer, using MOST, without the need for calibration, and the mean, standard deviation and skewness of air temperature.

The temperature-variance method is not the only one that can be used to estimate evaporation in near real-time, and the following additional methods may be used:

Additional Methods of Estimating Evaporation
Sensible Heat Flux From the Air Temperature Structure Function of Order Three High frequency air temperature measurements and storage of the mean, standard deviation and skewness of air temperature by the system allow sensible heat flux to be determined. However, since it is not possible to determine the direction of the sensible heat flux using MOST, it is determined using the third-order air temperature structure function as is commonly used in surface renewal analysis. The sensible heat flux determined together with soil heat flux and net irradiance measurements, and knowledge of the canopy and temperature sensor heights, allow evaporation to be estimated in near real-time for the so-called inertial layer using MOST, without the need for calibration against other methods. The system therefore approaches a real-time evaporation estimation station for the inertial layer for which MOST applies.

For the roughness sub-layer, it has been shown that the sensible heat flux could be estimated from structure functions $[S^3(r)/r]_{max}$ where $$S^3(r) = \frac{1}{m-j}\sum_{i=j+1}^{m}(T_i - T_{i-j})^3$$

where m is the number of data points in the 30-min interval measured at frequency f, j is a sample lag between data points corresponding to a time lag (r=j/f), $T_i$ is the air temperature at time i and $T_{i-j}$ that at an earlier time i–j. While the temperatures and $S^3(r)/r$ values are available in near real-time, the maximum value of $S^3(r)/r$ may not always be known at the time of data collection and would therefore be determined offline unless it is known a priori. It has been shown that, without proof, that $H=H_{SF}$ is given by:

$$H = H_{SF} = \frac{k^{5/6}g^{1/3}}{\pi^{0.5}}\rho c_p(z-d)^{2/3}(\sigma_T/T)^{1/3}(S_r^3/r)^{1/3}$$

or $$H = H_{SF} = 0.575\rho c_p(z-d)^{2/3}(\sigma_T/T)^{1/3}(S_r^3/r)^{1/3}$$

where $\rho$ is the density of air, $c_p$ the specific heat capacity of air, z the measurement height and d approximately ⅔ of the canopy height.

Surface Renewal

If the second-, third- and fifth-order air temperature structure functions are stored sub-hourly, it has been shown that offline estimates of sensible heat flux using surface renewal ($H_{SR}$) are possible without the use of MOST. Thus, the temperature-variance measurement protocol may be extended to include the storage of the second-, third- and fifth-order air temperature structure functions. These functions allow the offline calculation of sensible heat flux using the so-called surface renewal method. The surface renewal method requires a demanding iterative procedure for the calculation of $H=H_{SR}$.

Air Temperature Structure Function

Another important attribute of the atmosphere is the air temperature structure function $C_T^2$ from which $C_n^2$, the structure parameter of refractive index, can be calculated. The parameter $C_T^2$ may be estimated using $$C_T^2 = \overline{(T_{11}-T_{12})^2}/x^{2/3}$$

From air temperature difference measurements where the overbar indicates a time average (typically 20, 30 or 60 min), $T_{11}$ and $T_{12}$ are air temperatures measured a horizontal distance x apart and $C_n^2$ is determined using:

$$C_T^2 = C_n^2 \cdot \left(\frac{T^2}{aP}\right)^2 \cdot \left(1 + \left(\frac{0.03}{\beta}\right)^2\right)^{-1}$$

assuming no correlation between water vapour pressure and air temperature fluctuations, where T is the air temperature (K), $a=0.789 \times 10^{-3}$ K kPa$^{-1}$ at 670 nm, P is the atmospheric pressure (kPa) and $\beta$ the Bowen ratio. The optimum distance x has not been stated in the literature but typically it probably less than 0.5 m. Since the air temperature may vary in the vertical due to the temperature difference between the canopy surface and the overlying air, measurements of $T_{11}$ and $T_{12}$ should be in the horizontal plane separated by a known distance. If a wind speed sensor is part of the measurement system, the friction velocity may be estimated. Offline, using an iterative procedure, $H=H_{MOST}$ may be estimated using MOST.

Figure 6:
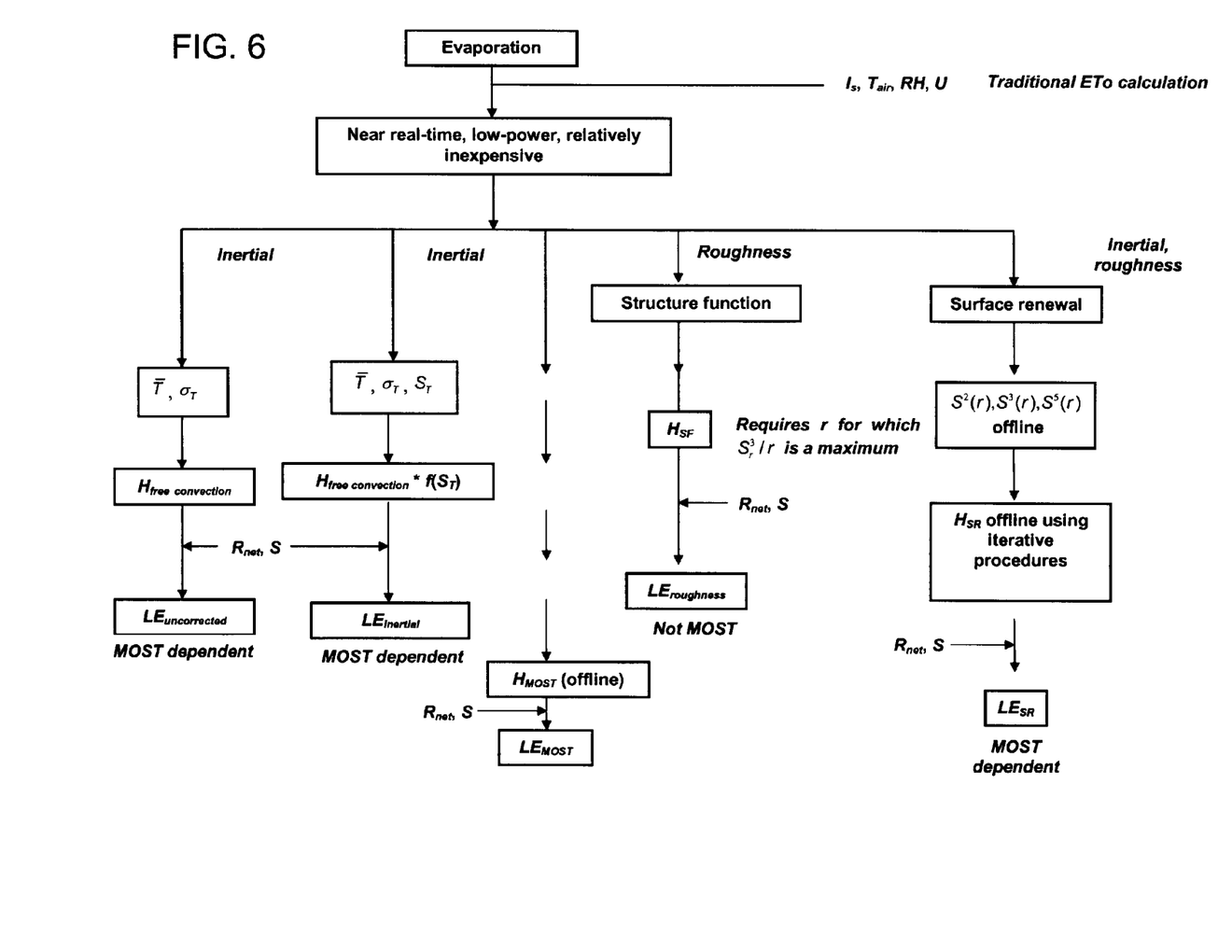
FIG. 6 shows a free convection, temperature variance with skewness, air temperature difference, structure function and surface renewal methods for determination of evaporation (LE) in accordance with an example embodiment.

The above methods of estimating evaporation in near real-time are summarised in Table 1 below and in FIG. 6.

The invention as hereinbefore described provides a relatively inexpensive way of obtaining evaporation estimates over a large area and is therefore potentially useful for validating remote sensing and other estimates of evaporation. For example, the invention may provide a method of "ground-truthing" evaporation data obtained by satellites.

The system is also conveniently an evaporation estimation and an atmospheric stability station. The surface renewal analysis method for determining the direction of sensible heat flux avoids the need for additional measurements such as wind speed and air temperature profile measurements to be taken to determine the direction of the flux. Sensible heat flux, together with a stability correction using skewness, and the direction of the flux, can be determined from high frequency measurements using a single fine-wire thermocouple in near real-time. If net irradiance and soil heat flux sensors are available, evaporation may then be calculated. These results are outputs of the invention.

The invention reduces the tediousness and computational complexity required to determine evaporation estimates. The system conveniently allows for evaporation estimates to be determined directly and substantially in real-time.

TABLE 1

Summary of procedures for near real-time estimation of evaporation.
(Offline evaporation estimation procedures are included).

| Sensors | Measurements | Estimation/calculation | Method | Comment | Additional measurements for estimating LE |
|---|---|---|---|---|---|
| Fine-wire thermocouple at height $z_1$ | $T_{11}$ at high frequency | $H = H_{TV}$, corrected for skewness, online | Temperature variance corrected for skewness for the inertial sub-layer | MOST is assumed. The sign of H is determined from the sign of the ramp amplitude, using online surface renewal analysis, for each sub-hourly interval | $R_{net}$, S |
| Fine-wire temperature difference pair at height $z_1$ | $T_{11}$, $T_{12}$, $C_T^2$ (related to $T_{11}$-$T_{12}$) at high frequency | $C_n^2$, online | Direct calculation for the inertial sub-layer | Additional measurement of horizontal wind speed allows $H = H_{MOST}$ to be calculated offline using an iterative procedure | $R_{net}$, S |
| Fine-wire thermocouple at height $z_1$ | $T_{11}$ at high frequency | $H = H_{SF}$, online if the value of r for which $S_r^3/r$ is a maximum is known a priori | Structure function method for the roughness sub-layer | Requires the third-order temperature structure function from online measurements and the maximum of a ratio needs to be determined offline. MOST is not assumed and method may be used in the roughness sub-layer | $R_{net}$, S |
| Fine-wire thermocouple at height $z_1$ | $T_{11}$ at high frequency | $H = H_{SR}$, offline | Surface renewal | Requires knowledge of weighting factor by comparing $H_{SR}$ estimates with $H_{EC}$; MOST not assumed | $R_{net}$, S |
| Solarimeter, relative humidity, air temperature, wind speed, wind direction, rain gauge | Solarimeter irradiance, water vapour pressure, air temperature, wind speed, wind direction at low frequency | $ET_o$ (grass and tall-crop), online. Hence the crop factor $K = H_{TV}/ET_o$ may be calculated | Penman-Monteith for estimating grass reference evaporation | The net irradiance and soil heat flux measurements would be useful but are not essential | |

This method of determining $C_T^2$ in approximate real-time provides another use of the measurements from the fine-wire thermocouples. It also provides for an inexpensive method of determining $C_T^2$ in near real-time.

Reference Evaporation

If relative humidity and wind speed are also measured, grass reference and tall-crop reference evaporation ($ET_0$) may also be calculated online and sub-hourly using the Penman-Monteith method. Hence crop factors may be determined online from $K=LE_{TV}/ET_0$.

Key to Selected Variables in Flowchart $$S_T = \frac{1}{\sigma_T^3} \sum (T_i - \overline{T})^3 / n$$

$$S^2(r) = \frac{1}{m-j} \sum_{i=j+1}^{m} (T_i - T_{i-j})^2$$

-continued $$S^3(r) = \frac{1}{m-j} \sum_{i=j+1}^{m} (T_i - T_{i-j})^3$$

$$S^5(r) = \frac{1}{m-j} \sum_{i=j+1}^{m} (T_i - T_{i-j})^5$$

where m is the number of high frequency measurements in the averaging period, typically 20 or 30-min (e.g. at 10 Hz measurement frequency, m=12000 sample temperature measurements for a 20-min averaging period); and j is the number of lags for which r=i/j is the time lag (e.g. if j=1 lag then r=1/(10 Hz)=0.1 s).

The sum is performed over i from i+j to m where $T_i$ is the i th air temperature sample.

The invention claimed is:

1. A method of estimating evaporation representing an area at a particular location, the method comprising the steps of:
   receiving, from at least one air temperature sensor at the particular location, air temperature information;
   determining, by using a processor, at least average air temperature, standard deviation of the air temperature, and skewness of the air temperature at the particular location substantially sub-hourly, by utilising the received air temperature;
   receiving, from a soil heat flux plate, soil heat flux information, the soil heat flux information being indicative of soil heat flux at the particular location;
   receiving, from a net radiometer, net irradiance information, the net irradiance information being indicative of net irradiance at the particular location;
   determining, sub-hourly, by using a processor, sensible heat flux at the particular location by utilising at least the determined average air temperature, standard deviation of the air temperature, and skewness of the air temperature associated with the particular location, and
   determining, sub-hourly, by using a processor, an estimate of the evaporation at the particular location by utilising the determined sensible heat flux, received soil heat flux information, and received net irradiance information, wherein the estimate of the evaporation is utilised for water resource management.

2. A method as claimed in claim 1, further comprising estimating, by using a processor, evaporation substantially in real-time or near real-time.

3. A method as claimed in claim 1, further comprising receiving, from a mobile or portable datalogger device, the air temperature information indicative of the skewness of air temperature, wherein the datalogger device comprises a statistical moment function to determine the skewness of the air temperature substantially in real-time from air temperature information received from a temperature sensor which is connected to the device or forms part thereof.

4. A method as claimed in claim 3, further comprising determining, by using a processor, the skewness of the air temperature in real-time from statistical moment information associated with the air temperature information received from the datalogger.

5. A method as claimed in claim 1, further comprising:
   determining, by using a processor, a structure function of air temperature, $C_T^2$ substantially in real-time; and
   determining, by using a processor, a structure parameter of refractive index, $C_n^2$, in real-time, by utilising the determined structure function of air temperature $C_T^2$.

6. A method as claimed in claim 5, further comprising:
   receiving, at a processor, air temperature difference information between air temperatures measured by first and second air temperature sensors respectively which are located at the particular location; and
   determining, by using a processor, the structure function of air temperature $C_T^2$ by utilising the received air temperature difference information and a sensor distance between the first and second temperature sensors.

7. A method as claimed in claim 1, further comprising determining, by using a processor, the sensible heat flux by implementing a temperature-variance method, which includes adjustment for air temperature skewness, in the inertial sub-layer.

8. A method as claimed in claim 7, wherein the temperature variance method relies on Monin-Obukhov Similarity Theory ("MOST").

9. A method as claimed in claim 1, further comprising determining, by using a processor, the sensible heat flux offline by way of an iterative procedure using MOST by utilising the determined structure parameter of refractive index $C_n^2$.

10. A method as claimed in claim 1, further comprising determining, by using a processor, the sensible heat flux, for the roughness sub-layer, by implementing an air temperature structure function for a user-specified time lag.

11. A method as claimed in claim 10, further comprising determining, by using a processor, air temperature structure functions of order two, three and five respectively and using them to determine sensible heat flux offline by way of a surface renewal method which is implemented by the processor.

12. A method as claimed in claim 1, wherein determining the estimate of evaporation comprises subtracting, by using a processor, the determined sensible heat flux and received soil heat flux from the net irradiance.

13. A system for estimating evaporation representative of an area at a particular location, the system comprising:
   an air temperature receiver module arranged to receive air temperature information from temperature sensors at the particular location;
   a processor operable to use the received air temperature information to determine at least average air temperature, standard deviation of the air temperature, and skewness of the air temperature at the particular location sub-hourly;
   a soil heat flux receiver module arranged to receive soil heat flux information from a soil heat flux plate, the soil heat flux information being indicative of soil heat flux of the particular location;
   a net irradiance receiver module arranged to receive net irradiance information from a net radiometer, the net irradiance information being indicative of net irradiance associated with the particular location;
   a sensible heat flux determining module arranged to determine, in real-time, sensible heat flux associated with the particular location by using at least the determined at least average air temperature, standard deviation of the air temperature, and skewness of the air temperature at the particular location substantially sub-hourly, and
   an evaporation determining module arranged to determine, in real-time, an estimate of the evaporation level of the particular location by using at least the determined sensible heat flux, received soil heat flux information, and received net irradiance information, wherein the estimate of the evaporation is utilised for water resource management.

14. A system as claimed in claim 13, which includes:
one or more air temperature sensors for measuring air temperature at the particular location, and wherein the air temperature receiver module is arranged to receive air temperature information from the temperature sensor at the particular location;
a soil heat flux plate for measuring soil heat flux at the particular location, and wherein the soil heat flux receiver module arranged to receive soil heat flux information from the soil heat flux plate, the soil heat flux information being indicative of soil heat flux of the particular location; and
a net radiometer for measuring the net irradiance associated with the particular location, and wherein the net irradiance receiver module is arranged to receive net irradiance information from the net radiometer, the net irradiance information being indicative of net irradiance associated with the particular location.

15. A system as claimed in claim 14, wherein the air temperature receiver module is communicatively coupled with a mobile or portable datalogger device, the datalogger device arranged for applying a statistical moment function to determine the skewness of the air temperature in real-time.

16. A system as claimed in claim 14, wherein the sensible heat flux determining module is arranged to determine the sensible heat flux by a temperature variance method, including adjustment for air temperature skewness, in the inertial sub-layer.

17. A system as claimed in claim 16, wherein the temperature variance method relies on Monin-Obukhov Similarity Theory (MOST).

18. A system as claimed in claim 14, wherein the processor is configured to:
determine a structure function of air temperature, $C_T^2$ in real-time and use the determined structure function of air temperature $C_T^2$ to determine a structure parameter of refractive index, $C_n^2$, in real-time.

19. A system as claimed in claim 18, further comprising wo temperature sensors which are communicatively connected to the processor and which are, in use, positioned in the same horizontal plane, and wherein the processor is configured to:
receive air temperature difference information between air temperatures measured by the first and second air temperature sensors respectively;
determine or receive a sensor distance between the first and second temperature sensors; and
use the received air temperature difference information and the determined or received sensor distance to determine the structure function of air temperature $C_T^2$.

20. A non-transitory machine-readable medium embodying instructions which, when executed by a machine, cause the machine to:
receive air temperature information from temperature sensors at a particular location;
use the received air temperature information to determine average air temperature, standard deviation of the air temperature, and skewness of the air temperature associated with the particular location sub-hourly;
receive soil heat flux information from a soil heat flux plate, the soil heat flux information being indicative of soil heat flux associated with the particular location;
receive net irradiance information from a net radiometer, the net irradiance information being indicative of net irradiance associated with the particular location;
determine, sub-hourly, sensible heat flux associated with the particular location by using at least the determined average air temperature, standard deviation of the air temperature, and skewness of the air temperature associated with the particular location sub-hourly, and
determine, sub-hourly, an estimate of the evaporation level of the particular location by using at least the determined sensible heat flux, received soil heat flux information, and received net irradiance information, wherein the estimate of the evaporation is utilised for validating a remote sensing of the evaporation level of the particular location.

21. A non-transitory machine-readable medium as claimed in claim 20, wherein the machine-readable instructions, when executed by a machine, further cause the machine to:
determine a structure function of air temperature, $C_T^2$ in real-time; and use the determined structure function of air temperature $C_T^2$ to determine a structure parameter of refractive index, $C_n^2$, in real-time.

22. A non-transitory machine-readable medium as claimed in claim 21, wherein the machine-readable instructions, when executed by a machine, cause the machine to:
receive air temperature difference information between air temperatures measured by first and second air temperature sensors respectively;
determine or receive a sensor distance between the first and second temperature sensors; and
use the received air temperature difference information and the determined or received sensor distance to determine the structure function of air temperature $C_T^2$.

23. A non-transitory machine-readable medium as claimed in claim 20, wherein the machine-readable medium is configured for reading by a datalogger device.

24. A non-transitory machine-readable medium as claimed in claim 20, wherein the machine-readable medium comprises embedded code executable by a datalogger device.

25. A datalogger device comprising:
an air temperature receiver module arranged to receive air temperature information from temperature sensors at a particular location;
a processor operable to use the received air temperature information to determine average air temperature, standard deviation of the air temperature, and skewness of the air temperature associated with the particular location sub-hourly;
a soil heat flux receiver module arranged to receive soil heat flux information from a heat flux plate, the soil heat flux information being indicative of soil heat flux associated with the particular location;
a net irradiance receiver module arranged to receive net irradiance information from a net radiometer, the net irradiance information being indicative of net irradiance associated with the particular location;
a sensible heat flux determining module arranged to determine, sub-hourly, sensible heat flux associated with the particular location by using at least the determined average air temperature, standard deviation of the air temperature, and skewness of the air temperature associated with the particular location, and an evaporation determining module arranged to determine, sub-hourly, an estimate of the evaporation level of the particular location by using at least the determined sensible heat flux, received soil heat flux information, and received net irradiance information, wherein the estimate of the evaporation is utilised in an atmospheric stability station for weather prediction.

26. A data-logging kit, comprising:
a datalogger device as claimed in claim 25; and
an air temperature difference sensor comprising:
  a first air temperature sensor; and
  a second air temperature sensor spaced at a predetermined sensor distance from the first air temperature sensor.

27. A datalogger device as claimed in claim 25, which includes:
  one or more air temperature sensors for measuring air temperature at the particular location, and wherein the air temperature receiver module is arranged to receive air temperature information from the temperature sensors at the particular location;
  a soil heat flux plate for measuring soil heat flux at the particular location, and wherein the soil heat flux receiver module arranged to receive soil heat flux information from the soil heat flux plate, the soil heat flux information being indicative of soil heat flux of the particular location; and
  a net radiometer for measuring the net irradiance associated with the particular location, and wherein the net irradiance receiver module is arranged to receive net irradiance information from the net radiometer, the net irradiance information being indicative of net irradiance associated with the particular location.

28. A datalogger device as claimed in claim 27, wherein the processor is configured to:
  determine a structure function of air temperature, $C_T^2$ in real-time; and
  determine a structure parameter of refractive index, $C_n^2$, in real-time, by using the determined structure function of air temperature $C_T^2$.

29. A datalogger device as claimed in claim 28, wherein the processor is configured to:
  receive air temperature difference information between air temperatures measured by first and second air temperature sensors respectively;
  determine or receive a sensor distance between the first and second temperature sensors; and
  using the received air temperature difference information and the determined or received sensor distance in order to determine the structure function of air temperature $C_T^2$.

30. A datalogger device as claimed in claim 27, wherein the processor is configured to apply a statistical moment instruction suitable for determining the skewness of the air temperature.

31. A datalogger device as claimed in claim 30, wherein the processor is configured to determine skewness from the moment of order three, average air temperature and the standard deviation of air temperature.

* * * * *